United States Patent [19]

Tyson

[11] 4,200,190
[45] Apr. 29, 1980

[54] BOBBER STOPPER

[76] Inventor: Raymond K. Tyson, 406 N. Carr Rd., Plainfield, Ind. 46168

[21] Appl. No.: 16,009

[22] Filed: Feb. 28, 1979

[51] Int. Cl.² ............................................ A63D 55/00
[52] U.S. Cl. .............................. 206/315 R; 24/129 B; 43/44.95; 206/820
[58] Field of Search ............... 206/315, 527, 526, 820; 24/129 B, 129 R, 129 D; 43/44.87, 44.9, 44.91, 44.92, 44.95

[56] References Cited

U.S. PATENT DOCUMENTS

| | | | |
|---|---|---|---|
| 1,153,053 | 9/1915 | Forster | 24/129 B |
| 2,127,667 | 8/1938 | Pflueger | 43/44.95 |
| 2,680,497 | 6/1954 | Miller | 206/820 |
| 2,861,379 | 11/1958 | Brown | 24/129 B |

FOREIGN PATENT DOCUMENTS 17291 of 1900 United Kingdom ...................... 24/129

*Primary Examiner*—William T. Dixon, Jr.

*Attorney, Agent, or Firm*—Woodard, Weikart, Emhardt & Naughton

[57] ABSTRACT

A bobber stopper for use with a slide bobber includes a substantially flat, flexible member having three spaced-apart holes therein extending from one end of the member to the opposite end. The fishing line is passed back and forth through these three holes in a weaving manner such that the hole edges and related frictional forces retain the stopper on the fishing line in a desired location while still permitting the bobber to be manually moved along the line. The stopper is large enough so as not to pass through the center clearance hole of a slide bobber yet small enough to easily pass through the line clearance hole of a casting or spinning reel. Associated with such bobber stoppers is a dispenser which includes a center annular ring disc and a plurality of stoppers detachably joined thereto in an evenly spaced, outwardly-radiating, circular array. Once the fishing line is threaded, the stopper is able to be torn free of the disc and utilized as described.

11 Claims, 7 Drawing Figures

BOBBER STOPPER

BACKGROUND OF THE INVENTION

This invention relates in general to fishing devices and in particular to bobber stoppers for use with slide bobbers.

Although most everyone is familiar with the two-tone, generally sperical bobbers which have a spring and hook arrangement by which they attach to the fishing line, there is another type of bobber frequently used with casting and spinning rods and reels. This other type of bobber is oblong in shape and is free to slide relative to the fishing line so that when casting the line into the water, the length of the tackle hanging beyond the tip of the pole is able to be kept to a minimum. Once the line hits the water, the weight of the sinker pulls the line into the water while the bobber remains afloat. The one item needed with this arrangement to enable the bobber to properly respond is a stopper of some type secured to the fishing line at a preselected location in order to stop the advancement of the line through the slide bobber when this stopper contacts the top of the slide bobber.

One stopper design which is currently available involves the use of a flexible dumbbell-shaped member with a hole adjacent each end. The method of use is to insert the fishing line in one hole, wrap the line around the central part of the stopper body and then out the other hole. While the wrapping around provides the necessary friction to retain the stopper at a fixed location on the line, this also places a twist in the line such that each time a desired fishing depth is changed and the stopper manually moved up or down along the line, the line must twist in order to unwind as the stopper moves due to the spiral wrap of the line around the stopper. Another drawback of the currently available stopper design is that the end holes into which the fishing line is threaded are round and somewhat closely sized to the fishing line diameter. This makes threading of the line difficult and it would thus be an improvement to elongate the holes in order to provide a larger opening.

A still further drawback of such dumbbell-shaped stoppers is that they must be quite small in order to be able to pass through the line aperture or guide of the corresponding spinning or casting reel. Since the required size is quite small, handling and manipulating the stoppers during their placement and threading onto the fishing line becomes quite difficult. In addition, handling of the fishing line is also awkward. It would thus be a significant improvement if a dispenser for such stoppers could be provided which would facilitate this manipulation and enable an anglar to hold such stoppers and the fishing line in a convenient manner while threading the fishing line through the various holes.

While this dumbbell-shaped stopper is believed to represent the closest prior art, there have been other references developed and these are listed below.

| U.S. Pat. No. | Patentee |
| --- | --- |
| 2,791,925 | Peters |
| 3,747,257 | Olsen |
| 3,153,298 | Lemon |
| 2,761,238 | Shiverdecker |
| 3,174,249 | Louden |
| 3,359,676 | Crossan |

Peters discloses a dispenser for deformable elements such as a fishing sinker wherein a disc-like member of two plys sandwiches therebetween a circular array of such sinkers. Once a fishing line is passed through the split of one sinker and clamped thereto, the sinker may be extracted from the dispenser.

Olsen discloses an adjustable weight bobber having a hollow interior and a removable cap. The interior of the bobber may be filled or partially filled with water, sand or other material to provide a desired amount of ballast so that the bobber may be used in casting and will provide the necessary weight for casting lightweight lures.

Lemon discloses a fishing device in the form of a flasher or a fish lure which is designed to follow a zig zag course as it is drawn through the water.

Shiverdecker discloses an anglar's device intended for weighting a fisherman's line wherein the gross weight of the device can be easily and readily changed in magnitude. The device includes a top hole as well as a bottom hole through which the fishing line is threaded.

Louden discloses a fishing line accessory, the construction of which permits it to be utilized as a casting weight, a sinker, a line connector and even a bobber. One feature of this accessory item is that it may have its position on the line changed due to its particular structure and this changeable location aspect is not available with conventional "split shot" sinkers. A pair of holes are provided at opposite ends of the accessory through which the fishing line is passed.

Crossan discloses a fishing line sinker having a substantially flat central body portion and integral therewith at each end twisted end portions with holes therethrough. The plane of these twisted end portion is perpendicular to the plane of the central body portion and each twisted end has a clearance hole therethrough for threading of the fishing line.

While these various patents relate to various fishing devices and apparata, none disclose a bobber stopper for use with slide bobbers and thus these listed references are believed to be of only limited relevancy to the subject invention.

SUMMARY OF THE INVENTION

A bobber stopper for use with a slide bobber according to one embodiment of the present invention comprises a substantially flat, flexible body member having a pair of oppositely disposed end apertures extending therethrough and a third aperture disposed between the pair of oppositely disposed end apertures.

A bobber stopper dispenser for a bobber stopper of the type for use with a slide bobber according to another embodiment of the present invention comprises a main body member having a line clearance aperture therethrough and a plurality of bobber stoppers disposed in a spaced apart relationship about the line clearance aperture, each of the plurality of bobber stoppers being detachably joined to the main body member and each comprising a substantially flat, flexible body member having a pair of oppositely disposed end apertures extending therethrough and a third aperture disposed between the pair of oppositely disposed end apertures.

One object of the present invention is to provide an improved bobber stopper.

Related objects and advantages of the present invention will be apparent from the following description.

DESCRIPTION OF THE PREFERRED EMBODIMENTS

Figure 1:
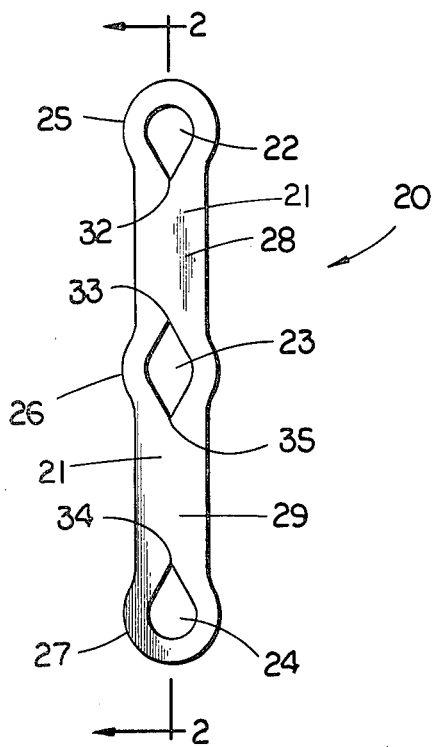
FIG. 1 is an enlarged plan view of a bobber stopper according to a typical embodiment of the present invention.

For the purposes of promoting an understanding of the principles of the invention, reference will now be made to the embodiments illustrated in the drawings and specific language will be used to described the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
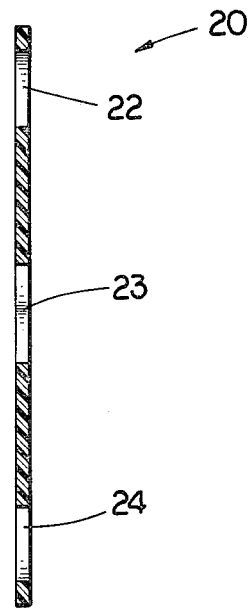
FIG. 2 is a full section view of the FIG. 1 bobber stopper as taken along line 2—2 in FIG. 1.

Referring to FIGS. 1 and 2, there is illustrated a bobber stopper 20 for use with a slide bobber which includes a substantially flat, flexible body member 21 and three openings 22, 23 and 24 extending through from one side of member 21 to the opposite side. Body member 21 is contoured with three part-circular portions 25, 26 and 27 surrounding and generally concentric with the three openings, respectively. Connecting adjacent part-circular portions are neck portions 28 and 29, each of which taper inwardly from their corresponding circular peripheries at each end to a somewhat rectangular midsection.

Openings 22 and 24 have a teardrop shape with their pointed ends oriented toward each other. Similarly, opening 23 is teardropped at each end such that pointed end 32 of opening 22 and pointed end 33 of opening 23 point toward each other as they extend into neck portion 28. On the opposite end of stopper 20, pointed end 34 and pointed end 35 point toward each other as they extend into neck portion 29.

Figure 3:
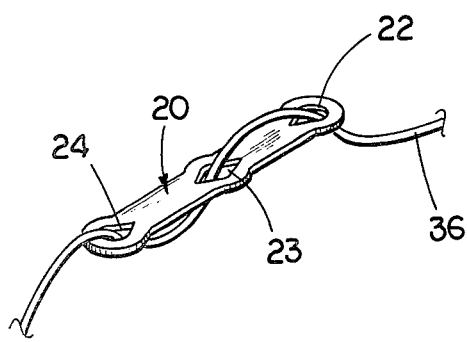
FIG. 3 is a perspective view of a section of fishing line threaded through the FIG. 1 bobber stopper.

Once bobber stopper 20 is properly threaded onto a fishing line 36 as is illustrated in FIG. 3, the back and forth weave of the line through openings 22, 23 and 24 secures the stopper to the line at a desired location. The line is not twisted and stopper 20 may be readily manually moved up or down the line in order to change the desired fishing depth. When casting or spinning with a slide bobber, the angler winds up the fishing line until the line and tackle extending beyond the end of the pole is of a minimum length. This length of the line from the hook (or lure) to the pole end is typically only one or one and one-half feet and this length is not prohibitive to a clean and accurate cast of the line and tackle out into the water.

With the slide bobber floating on the surface of the water, the weight of the sinker and other tackle pulls the excess line through the bobber and into the water. In order for the sliding bobber to be responsive to a fish, and for the hook and tackle to be suspended at a desired fishing depth, stop means must be provided on the line so as to cause the line to be unable to pass through the center clearance aperture of the slide bobber once the stop means are encountered. The disclosed bobber stopper 20 provides such a suitable stop means as will become apparent. One requirement of bobber stopper 20 is that its outer axial dimension (width) be greater than the slide bobber clearance aperture diameter. A dimension of 0.062 inches (1.57 mm) is sufficient for this purpose. A further constraint imposed on bobber stopper 20 is that it be suitably sized so that it is able to pass through casting and spinning reel line apertures or guides so that the stopper does not interfere with the winding up of the line as well as the casting out of the line. In order to assure this free movement, the maximum outer axial dimension of stopper 20 should be less than 0.13 inches (3.3 mm).

While it is important that stopper 20 be manually movalble up as well as down the fishing line in order to vary the fishing depth, it is equally important that when a fish takes the bait or lure that the bobber respond by going under the water rather than having the fishing line slide through the stopper openings and thus through the bobber. Proper bobber response is assured by the present invention by providing opening 23, which is not present in prior stopper devices, and which enables additional surface contact between stopper 20 and fishing line 36 thereby increasing the frictional forces between these two members. Earlier devices which utilized only two openings further required that the fishing line be wrapped around the central body portion of the stopper between the two end openings in order to achieve this requisite greater friction. A significant drawback of this earlier arrangement is that the wrapping around places a twist in the line. Thus, when the stopper is moved up or down on the fishing line, the line on one side of the stopper has to unwind as the stopper moves. Furthermore, since the holes in these earlier devices are round and closely sized to the fishing line diameter threading of the line into the holes is awkward. Thus, the teardrop shape of the openings 22-24 corresponds to the eye of a needle and facilitates threading of the fishing line.

Figure 4:
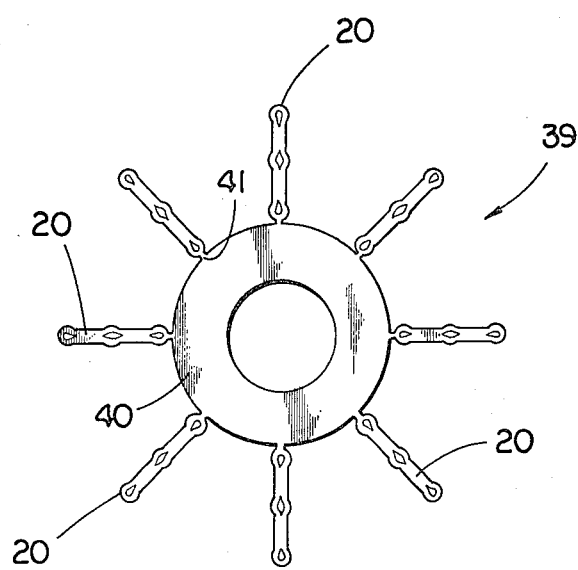
FIG. 4 is a plan view of a bobber stopper dispenser for use with the FIG. 1 bobber stopper.
Figure 5:
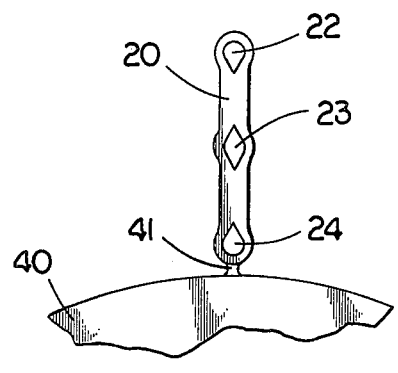
FIG. 5 is an enlarged partial detail view of the FIG. 4 dispenser.

While the disclosed stopper design is an improvement over prior devices, any item as small as stopper 20 is difficult to handle and manipulate, such as during the threaded procedure of line 36 into and through openings 22, 23 and 24 (see FIG. 3). In order to facilitate such handling and manipulation of the disclosed, improved bobber stopper 20, a plurality of stoppers are arranged as part of a dispenser 39 which includes a main body member or disc 40 in the shape of an annular ring and the plurality of stoppers are secured thereto in an evenly spaced, outwardly-radiating, circular array (see FIGS. 4, 5 and 5a). Each stopper 20 is retained on disc 40 by a thin and narrow connecting membrane 41 which is able to be torn by a moderately-low force level such that the stoppers are individually separable from disc 40. Although stoppers 20 are illustrated as being joined to dispenser 39, the dispenser concept for bobber stoppers generally is not intended to be limited by such a showing. It is envisioned that prior art bobber stoppers could be used with dispenser 39 as well as newly designed stoppers such as stoppers 20, but only having two end openings and not a center opening.

Figure 5A:
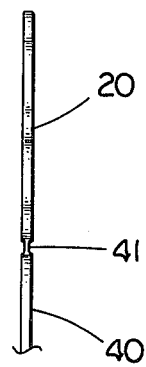
FIG. 5a is a side elevation view of the FIG. 5 enlarged partial detail of the FIG. 4 dispenser.

Membrane 41 may be a separate adhesive strip or similar joining member; but in the preferred embodiment, membrane 41 is a molded integral member such that dispenser 39 is a one-piece unit. As illustrated in FIG. 5a, membrane 41 is preferably of a thinner cross section than either stopper 20 or disc 40 and this further facilitates the tearable aspect of membrane 41. While eight stoppers are disclosed in an evenly spaced array, it should be understood that virtually any number of stoppers can be secured to or molded as part of disc 40 so long as gripping clearance is provided on either side of each stopper to be able to tear off the stoppers, one at a time. Similarly, disc 40 may be replaced by virtually any shaped central body member provided there is an aperture therethrough for receiving the fishing line. This clearance aperture is desirable in that it enables the line to be positioned such that the angler can grip both the dispenser 39 and the fishing line at the same time. This steadies the line while it is threaded into a stopper.

Figure 6:
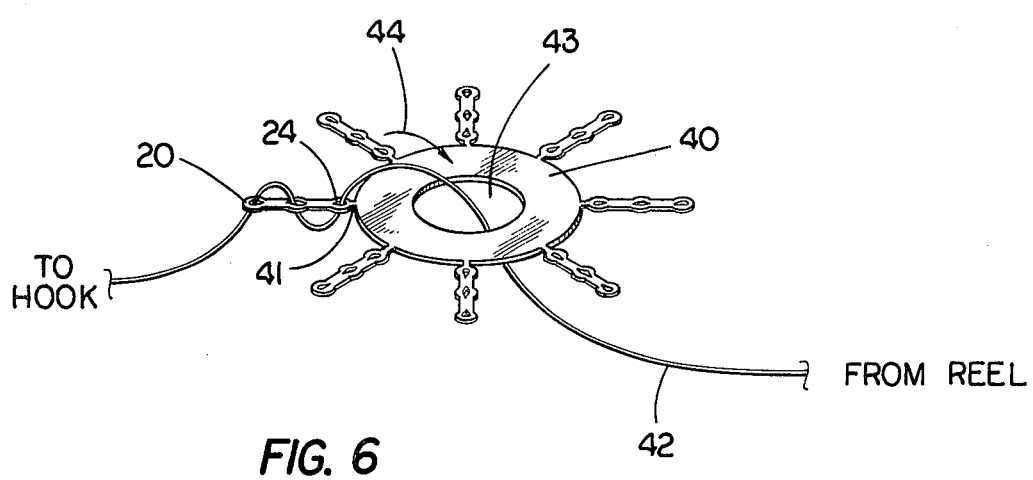
FIG. 6 is a perspective view of a section of fishing line threaded through the FIG. 4 dispenser.

The use of dispenser 39 is illustrated in FIG. 6 wherein the fishing line 42 from the reel is passed through central clearance aperture 43 and from there into opening 24 and so forth through the remaining stopper openings. The free end of line 42 may then be fitted with the desired fishing tackle once the stopper 20 is separated from the disc. Arrow 44 denotes the direction of movement to extract stopper 20 from dispenser 39 once it is threaded with line 42 and separated from disc 40. Dispenser 39 with the seven remaining stoppers still joined thereto is then able to be replaced in a tackle box. The use of dispenser 39 provides the angler with an easy method of holding a stopper while the fishing line is threaded thereto.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A bobber stopper for use with fishing line and a slide bobber wherein the fishing line is freely movable through said slide bobber until said bobber stopper is encountered, said bobber stopper being selectively positionable along said fishing line and remaining where positioned and being small enough to pass through the line apertures of fishing reels and comprising: a substantially flat, flexible body member having a pair of oppositely disposed end apertures extending therethrough and a third aperture disposed between said pair of oppositely disposed end apertures.

2. The bobber stopper of claim 1 in which said body member is arranged into three part-circular portions, each portion tapering toward adjacent part-circular portions with interconnecting neck portions.

3. The bobber stopper of claim 2 wherein each of said three apertures are substantially centered within a different one of said three part-circular portions, said two end apertures being of a teardrop shape, the pointed part of said shape extending into a corresponding neck portion, said third aperture being teardropped on opposite ends, the pointed parts of said third aperture similarly extending into corresponding neck portions.

4. The bobber stopper of claim 3 wherein said stopper has an overall outer width dimension of between 0.05 inches and 0.12 inches.

5. A dispenser for a bobber stopper of the type used with fishing line and a slide bobber wherein the fishing line is freely movable through said slide bobber until said bobber stopper is encountered, said bobber stopper remaining in a fixed position along said fishing line once selectively located and being small enough to pass through the line apertures of fishing reels, said dispenser comprising:
   a main body member having a line clearance aperture therethrough; and
   a plurality of bobber stoppers disposed in a spaced-apart relationship about said line clearance aperture, each of said plurality of bobber stoppers being detachably joined to said main body member and comprising:
   a substantially flat, flexible body member having a pair of oppositely disposed end apertures extending therethrough and a third aperture disposed between the pair of oppositely disposed end apertures, said clearance aperture having a size suitable to allow passage of a bobber stopper therethrough.

6. The dispenser of claim 5 wherein each of said plurality of bobber stoppers are retained on said main body member by means of a corresponding tearable connecting membrane.

7. The dispenser of claim 6 wherein said main body member has an annular ring shape and said plurality of bobber stoppers are disposed in an evenly spaced, outwardly-radiating pattern and connected by said membranes to the other periphery of said main body member.

8. The dispenser of claim 7 wherein said main body member and said plurality of bobber stoppers are fabricated as a one-piece integral unit.

9. A bobber stopper for use with fishing line and a slide bobber wherein the fishing line is freely movable through said slide bobber until said bobber stopper is encountered, said bobber stopper being selectively positionable along said fishing line and remaining fixed in location once positioned and comprising:
   a substantially flat, flexible body member being sufficiently small to pass through the line apertures of fishing reels and sufficiently large to stop movement of said slide bobber along said fishing line, said flexible body member including a pair of oppositely disposed end apertures extending therethrough and a third aperture disposed between said pair of oppositely disposed end apertures.

10. A bobber stopper for use with fishing line and a slide bobber wherein the fishing line is freely movable relative to the slide bobber, said bobber stopper remaining fixed in location on said fishing line where selectively positioned, said bobber stopper comprising:
   a flexible body member having an in-line series of three substantially evenly spaced-apart apertures, each aperture being elongated along the length direction of said flexible body member.

11. The bobber stopper of claim 10 wherein said flexible body member is of a suitable size and arrangement so as to be able to pass freely through the line apertures of fishing reels and the two endmost apertures of said three substantially evenly spaced-apart apertures having a teardrop shape wherein the points of said teardrop shapes are directed toward each other.

* * * * *